United States Patent [19]
Sasaki

[11] Patent Number: 5,949,280
[45] Date of Patent: Sep. 7, 1999

[54] MULTIVALUED FSK DEMODULATION WINDOW COMPARATOR

[75] Inventor: Teruo Sasaki, Tokyo, Japan

[73] Assignee: Nec Corporation, Tokyo, Japan

[21] Appl. No.: 08/928,485

[22] Filed: Sep. 12, 1997

[30] Foreign Application Priority Data

Sep. 12, 1996 [JP] Japan .................................... 8-241616

[51] Int. Cl.$^6$ .............................. H04L 27/14; H04L 25/06
[52] U.S. Cl. ........................... 329/303; 329/300; 327/74; 327/75; 375/324; 375/334; 375/317; 455/161.3; 455/134
[58] Field of Search ..................................... 375/334, 335, 375/340, 272, 286, 287, 317, 324; 327/74, 75; 329/300, 303; 455/161.3, 134

[56] References Cited

U.S. PATENT DOCUMENTS 5,710,795   1/1998   Tsumura ................................. 375/317

*Primary Examiner*—Arnold Kinkead
*Attorney, Agent, or Firm*—Sughrue, Mion, Zinn Macpeak & Seas, PLLC

[57] ABSTRACT

A multivalued FSK demodulation window comparator includes an MSB comparator, an LSB comparator, a reception electric field strength detector, and a reference voltage generating circuit. The MSB comparator determines at least the polarity of a frequency shift of a radio frequency. The LSB comparator determines the absolute value of the frequency shift of the radio frequency. The reception electric field strength detector detects the strength of a radio signal and outputs a signal corresponding to the detected strength. The reference voltage generating circuit changes the reference voltages of the LSB comparator in accordance with an output voltage from the reception electric field strength detector. When the output voltage from the reception electric field strength detector is not higher than a predetermined level, a reference voltage from the reference voltage generating circuit changes.

11 Claims, 11 Drawing Sheets

STRONG ELECTRIC FIELD          WEAK ELECTRIC FIELD

MULTIVALUED FSK DEMODULATION WINDOW COMPARATOR

BACKGROUND OF THE INVENTION

1. Field of the Invention

The present invention relates to a multivalued FSK demodulation window comparator and, more particularly, to a multivalued FSK demodulation window comparator capable of improving the sensitivity when a reception electric field is weak.

2. Description of the Prior Art

Figure 1:
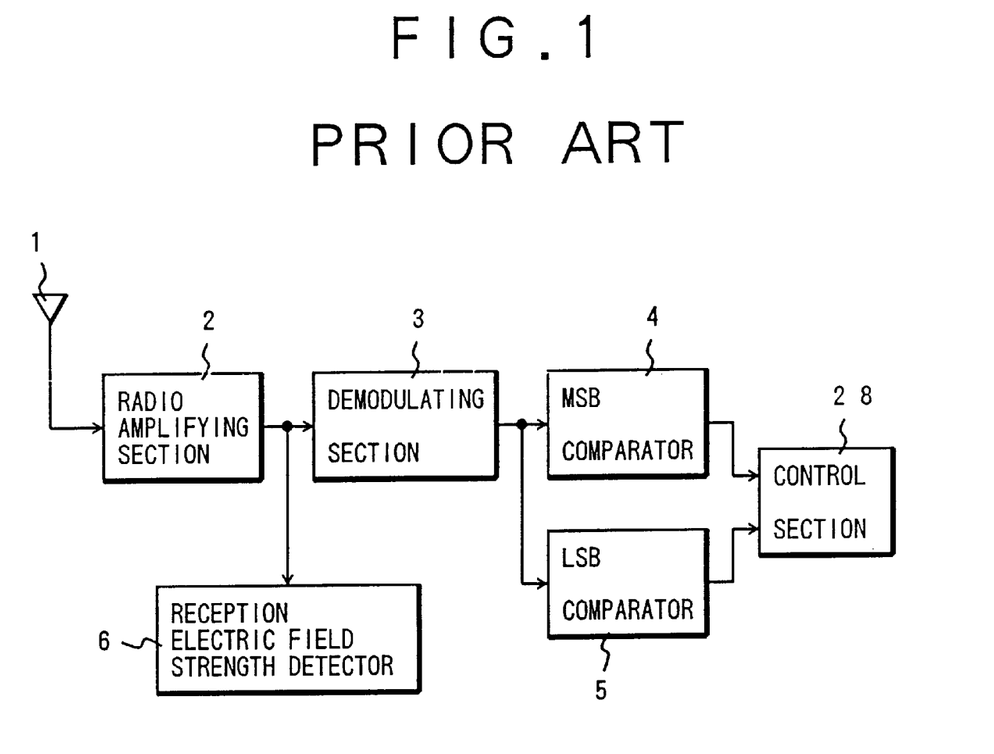
FIG. 1 is a block diagram showing the overall arrangement of a conventional quaternary FSK demodulation radio section.

FIG. 1 is a block diagram showing a conventional quaternary FSK demodulation radio section.

Figure 2:
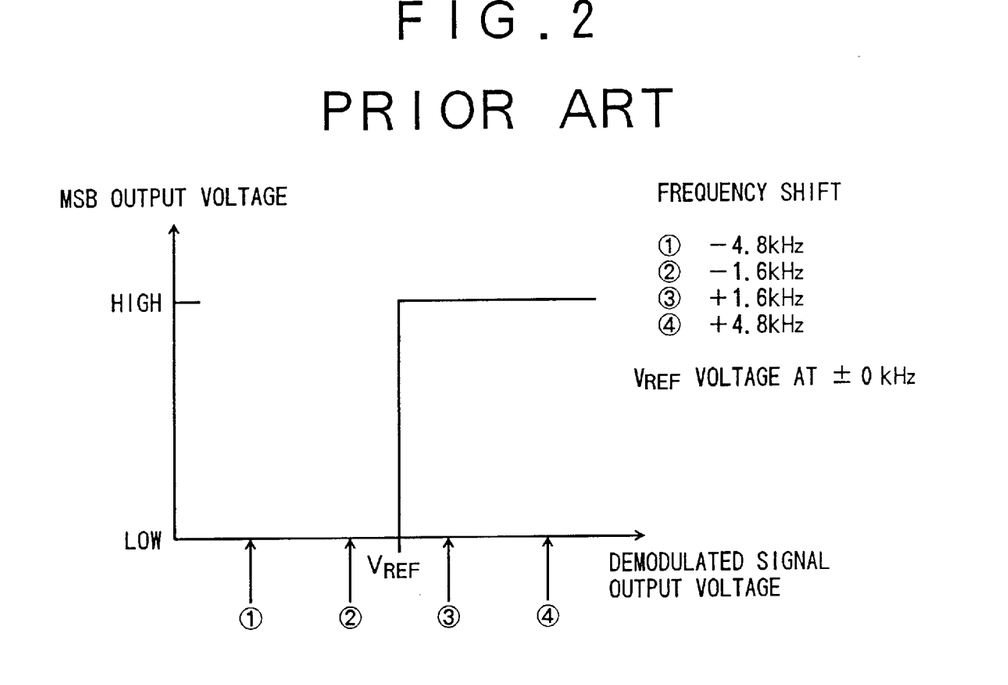
FIG. 2 is a graph showing the input/output characteristics of an MSB comparator in the prior art.
Figure 3:
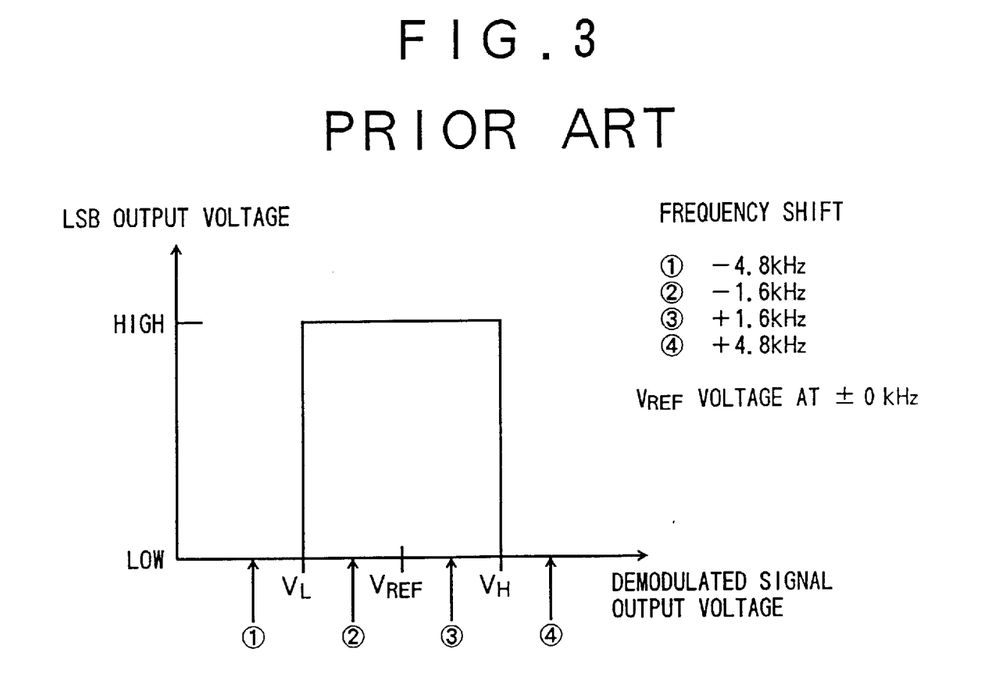
FIG. 3 is a graph showing the input/output characteristics of an LSB comparator in the prior art.

A radio signal received by an antenna 1 is amplified by a radio amplifying section 2. The frequency shift data of the resultant FM demodulated signal is converted into an analog voltage value by a quadrature detection circuit in a demodulating section 3. The demodulated analog voltage value is converted into 2-bit digital parallel data consisting of a most significant bit MSB and a least significant bit LSB by an MSB comparator 4 having the input/output characteristics shown in FIG. 2 and an LSB comparator 5 having the input/output characteristics shown in FIG. 3. The MSB is the result obtained by determining the polarity of the frequency shift. The LSB is the result obtained by determining the magnitude of the absolute value of the frequency shift.

Figure 4A:
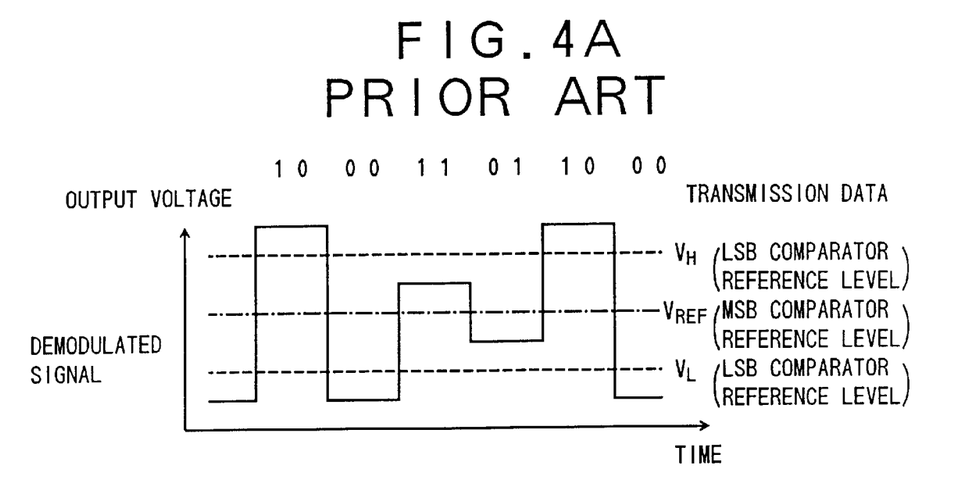
FIGS. 4A, 4B, and 4C are graphs showing a demodulated signal and operations of the MSB and LSB comparators in the prior art.
Figure 4B:
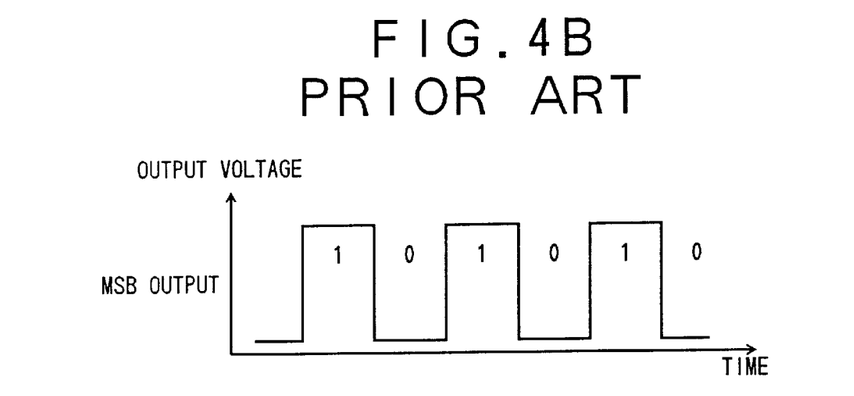
Figure 4C:
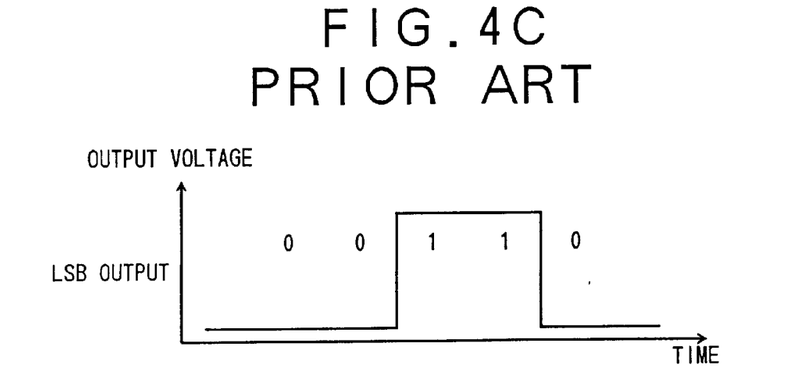

FIGS. 4A, 4B, and 4C are graphs showing a demodulated signal and operations of the MSB and LSB comparators in the prior art.

To determine the polarity of a frequency shift, the MSB comparator 4 has a reference level set to a level $V_{REF}$ corresponding to the center of the waveform. To determine the magnitude of a frequency shift, the LSB comparator 5 has a reference level set to a level $V_H$ corresponding to the intermediate value between demodulated signal voltages corresponding to data "10" and "11", and a reference level set to a level $V_L$ corresponding to the intermediate value between demodulated signal voltages corresponding to data "01" and "00".

Figure 5:
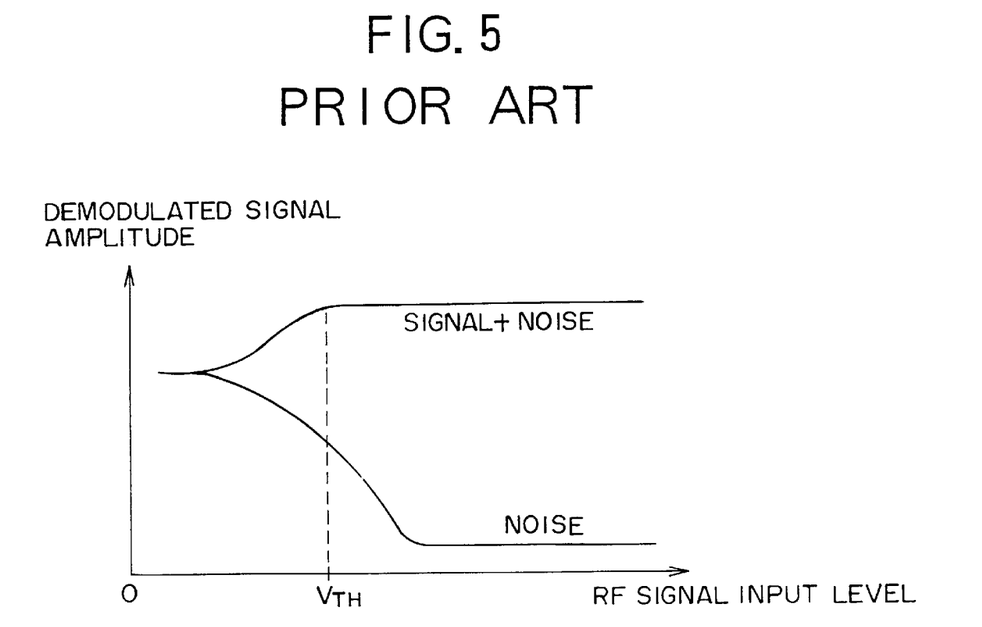
FIG. 5 is a graph showing S/N characteristics in conventional FM modulation.
Figure 6:
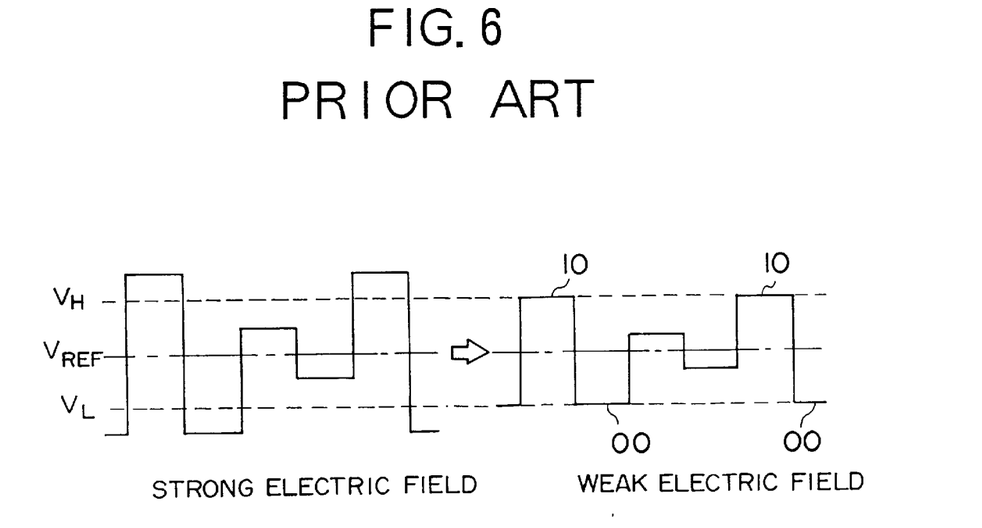
FIG. 6 is a timing chart for explaining the relationship between an RF signal input level and comparator reference levels in the prior art.

FIG. 5 is a graph showing the general S/N characteristics of a conventional FSK demodulation circuit. When the RF signal input level is sufficiently high, the demodulated signal level is constant. When, however, the RF signal input level becomes lower than a certain level (e.g., $V_{TH}$), the demodulated signal level decreases with respect to the level $V_{REF}$. FIG. 6 is a timing chart for explaining the relationship between an RF signal input level and comparator reference levels in the prior art.

In this conventional FSK demodulation comparator, since the LSB comparator reference levels remain at constant voltages regardless of the magnitude of an RF signal input, the relationship between the LSB comparator reference levels and the demodulated signal amplitude voltage obtained when the RF signal input is large differs from the relationship between the LSB comparator reference levels and the demodulated signal amplitude voltage obtained when the RF signal input is small. This indicates that when the RF signal input becomes lower than a certain level, the LSB comparator cannot perform correct signal determination.

SUMMARY OF THE INVENTION

The present invention has been made in consideration of the above situation, and has as its object to provide a multivalued FSK demodulation window comparator which causes LSB comparator reference levels to follow a change in demodulated signal amplitude, when the reception electric field is weak, so as to keep the positional relationship between a demodulated signal and the LSB comparator reference levels constant, thereby improving the reception sensitivity.

In order to achieve the above object, according to the first aspect of the present invention, there is provided a multivalued FSK demodulation window comparator comprising an MSB comparator for determining at least a polarity of a frequency shift of a radio frequency, an LSB comparator for determining an absolute value of the frequency shift of the radio frequency, a reception electric field strength detector for detecting a strength of a radio signal and outputting a signal corresponding to the detected strength, and a reference voltage generating circuit for changing reference voltages of the LSB comparator in accordance with an output voltage from the reception electric field strength detector, wherein when the output voltage from the reception electric field strength detector is not higher than a predetermined level, a reference voltage from the reference voltage generating circuit changes.

According to the second aspect of the present invention, the multivalued FSK demodulation window comparator of the first aspect is characterized in that the reference voltage generating circuit is designed to change reference voltages of the LSB comparator in accordance with a point at which the absolute value of the frequency shift of the radio signal decreases when the output voltage from the reception electric field strength detector is not higher than the predetermined level.

According to the third aspect of the present invention, the multivalued FSK demodulation window comparator of the first aspect is characterized in that the reference voltage generating circuit is designed to change reference voltages of the LSB comparator by a DC voltage proportional to the output voltage from the reception electric field strength detector in a direction in which the absolute value of the frequency shift of the radio signal decreases when the output voltage from the reception electric field strength detector is not higher than the predetermined level.

According to the fourth aspect of the present invention, the multivalued FSK demodulation window comparator of the first aspect is characterized in that the reference voltage generating circuit is designed to change reference voltages of the LSB comparator by a DC voltage proportional to an amount of variation in the output voltage from the reception electric field strength detector in a direction in which the absolute value of the frequency shift of the radio signal decreases when the output voltage from the reception electric field strength detector is not higher than the predetermined level.

According to the fifth aspect of the present invention, the multivalued FSK demodulation window comparator of the first aspect is characterized in that the reference voltage generating circuit is designed to change reference voltages of the LSB comparator by a predetermined voltage, regardless of the output voltage from the reception electric field strength detector, in a direction in which the absolute value of the frequency shift of the radio signal decreases when the output voltage from the reception electric field strength detector is not higher than the predetermined level.

According to the sixth aspect of the present invention, the multivalued FSK demodulation window comparator of the first aspect is characterized in that the LSB comparator comprises an LSB comparator having a plurality of input terminals, a plurality of reference voltage input terminals, and a plurality of determination output terminals and designed to determine an absolute value of a frequency shift of a radio frequency so as to perform multivalued determination.

According to the seventh aspect of the present invention, the multivalued FSK demodulation window comparator of the first aspect is characterized in that the multivalued FSK demodulation window comparator is an octonary FSK demodulation window comparator.

According to the multivalued FSK demodulation window comparator of the present invention, since the LSB comparator reference levels follow a change in demodulated signal amplitude when the reception electric field is weak, the positional relationship between the demodulated signal and the comparator reference levels can be kept constant. With this arrangement, a signal can be received even in a weak reception electric field, in which signal reception cannot be performed in the prior art.

The above and many other objects, features and advantages of the present invention will become manifest to those skilled in the art upon making reference to the following detailed description and accompanying drawings in which preferred embodiments incorporating the principles of the present invention are shown by way of illustrated examples.

DETAILED DESCRIPTION OF THE PREFERRED EMBODIMENTS

Several preferred embodiments of the present invention will be described below with reference to the accompanying drawings.

Figure 7:
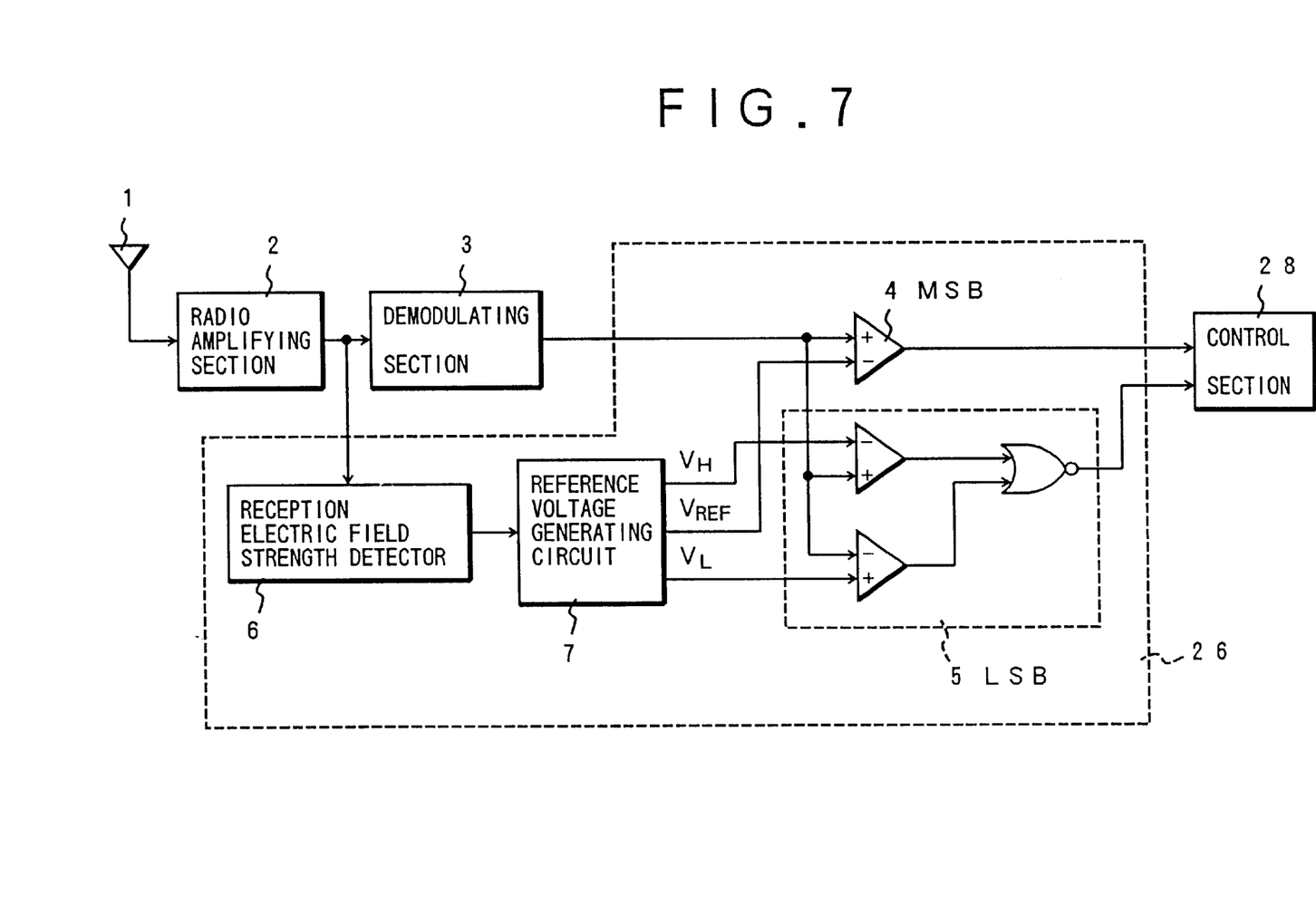
FIG. 7 is a block diagram showing a quaternary FSK demodulation radio section according to the first embodiment of the present invention.

FIG. 7 is a block diagram showing a quaternary FSK demodulation radio section according to the first embodiment of the present invention.

An FM modulated signal received by an antenna 1 is amplified by a radio amplifying section 2 and demodulated by a demodulating section 3. An MSB comparator 4 and an LSB comparator 5 convert the demodulated signal into a waveform which can be read by a control section 28. The MSB comparator 4 has one input terminal, one reference voltage input terminal, and one determination output terminal and is designed to determine a polarity of a frequency shift of a radio frequency so as to perform multivalued determination. The LSB comparator 5 has two input terminals, two reference voltage input terminals, and one determination output terminal and is designed to determine the absolute value of a frequency shift of a radio frequency so as to perform multivalued determination.

Figure 10:
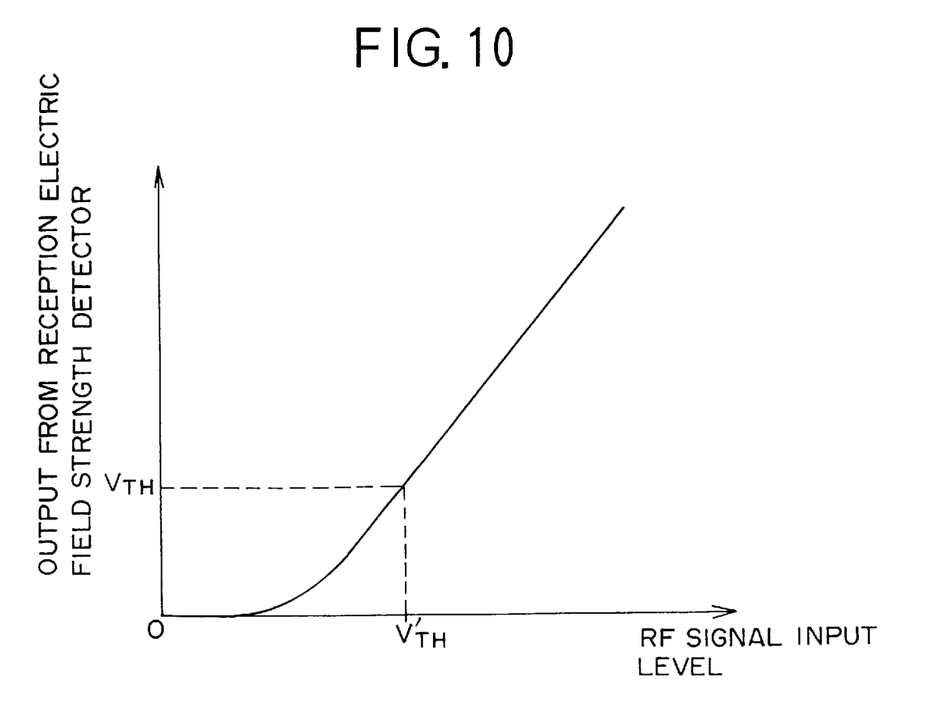
FIG. 10 is a graph showing the input/output characteristics of a reception electric field strength detector in FIG. 1.

The signal amplified by the radio amplifying section 2 and sent to the demodulating section 3 is also sent to a reception electric field strength detector 6. The reception electric field strength detector 6 outputs a DC voltage signal to a reference voltage generating circuit 7 in accordance with the amplitude of this signal and the input/output characteristics shown in FIG. 10.

Figure 8:
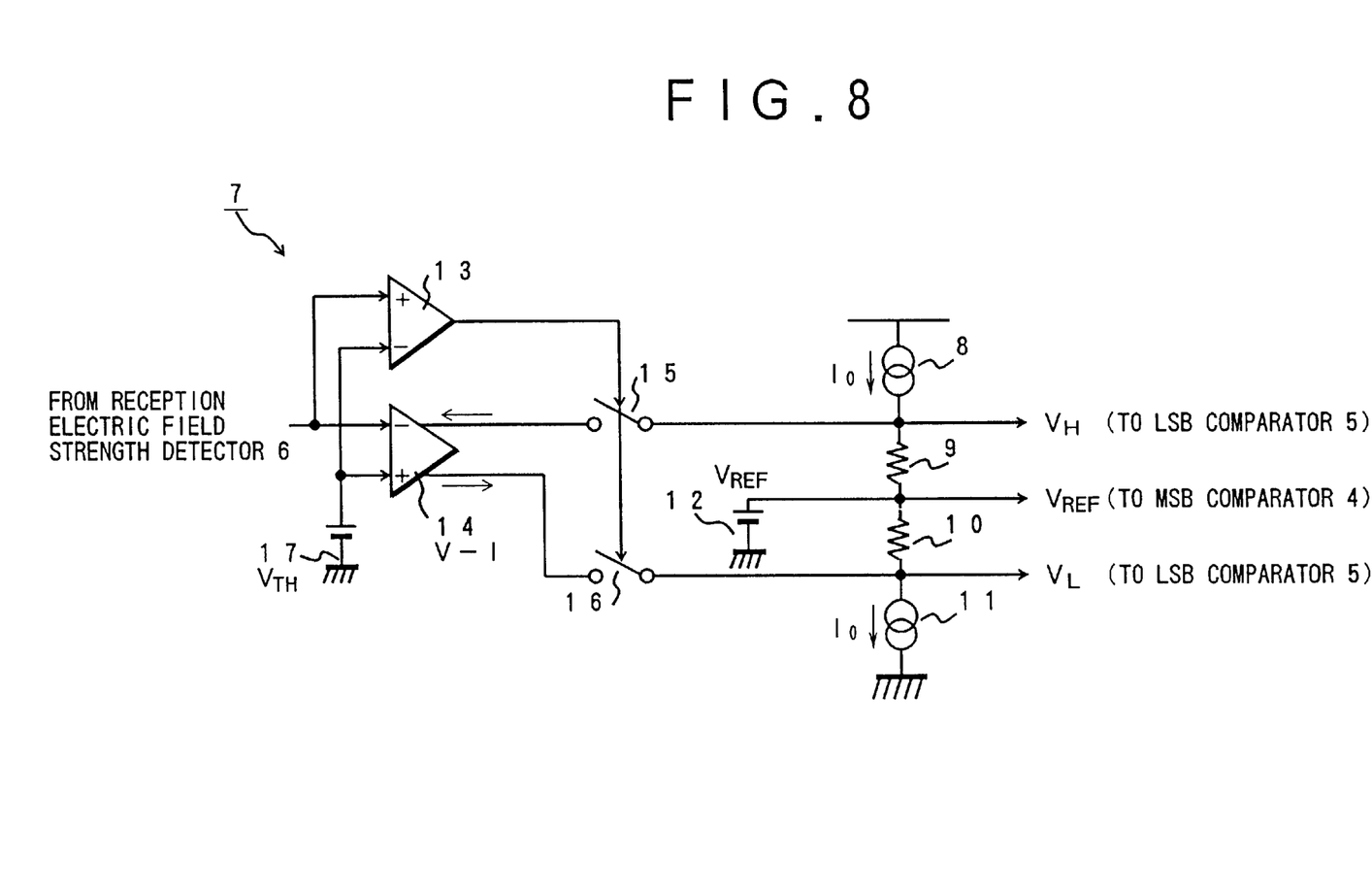
FIG. 8 is a circuit diagram showing a reference voltage generating circuit in the embodiment shown in FIG. 7.

As shown in the block diagram of FIG. 8, the reference voltage generating circuit 7 includes a voltage comparator 13, a V-I amplifier 14, a $V_{TH}$ bias 17, a $V_{REF}$ bias 12, switches 15 and 16, constant current sources 8 and 11, and resistors 9 and 10.

Figure 9:
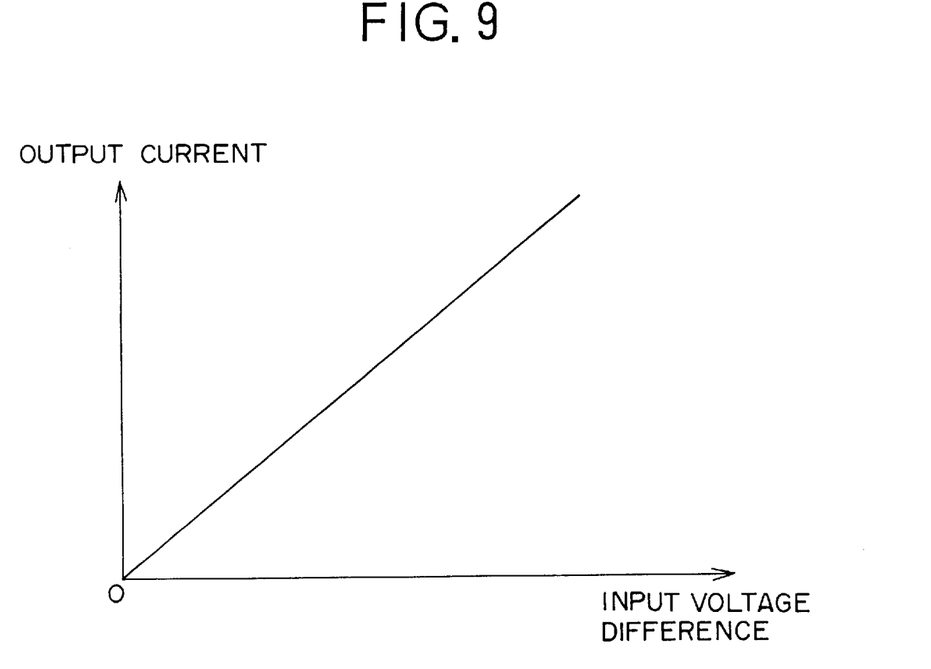
FIG. 9 is a graph showing the input characteristics of a V-I amplifier used in the circuit shown in FIG. 8.

The V-I amplifier 14 has the input/output characteristics shown in FIG. 9. The voltage comparator 13 has the property of outputting a HIGH signal when an output voltage from the reception electric field strength detector 6 is equal to or higher than a level $V_{TH}$, and outputting a LOW signal when the output voltage from the reception electric field strength detector 6 is lower than the level $V_{TH}$. Each of the switches 15 and 16 has the property of being turned off upon reception of a HIGH signal, and being turned on upon reception of a LOW signal.

The operation of this embodiment of the present invention will be described in detail next with reference to FIG. 8.

When an output voltage from the reception electric field strength detector 6 is equal to or higher than the level $V_{TH}$, a HIGH signal is output from the voltage comparator 13, and the switches 15 and 16 are turned off. Consequently, a constant current $I_O$ flows in the resistors 9 and 10, and $V_H$ and $V_L$ become constant voltages. In contrast to this, when the electric field strength of the radio signal decreases, and the output voltage from the reception electric field strength detector 6 becomes lower than the level $V_{TH}$, a LOW signal is output from the voltage comparator 13, and the switches 15 and 16 are turned on. The V-I amplifier 14 then converts the difference voltage with respect to the level $V_{TH}$ into a current, and the current flowing between the resistors 9 and 10 decreases. Therefore, the potential difference between the resistors 9 and 10 decreases in accordance with a decrease in the output voltage from the reception electric field strength detector 6.

Figure 11:
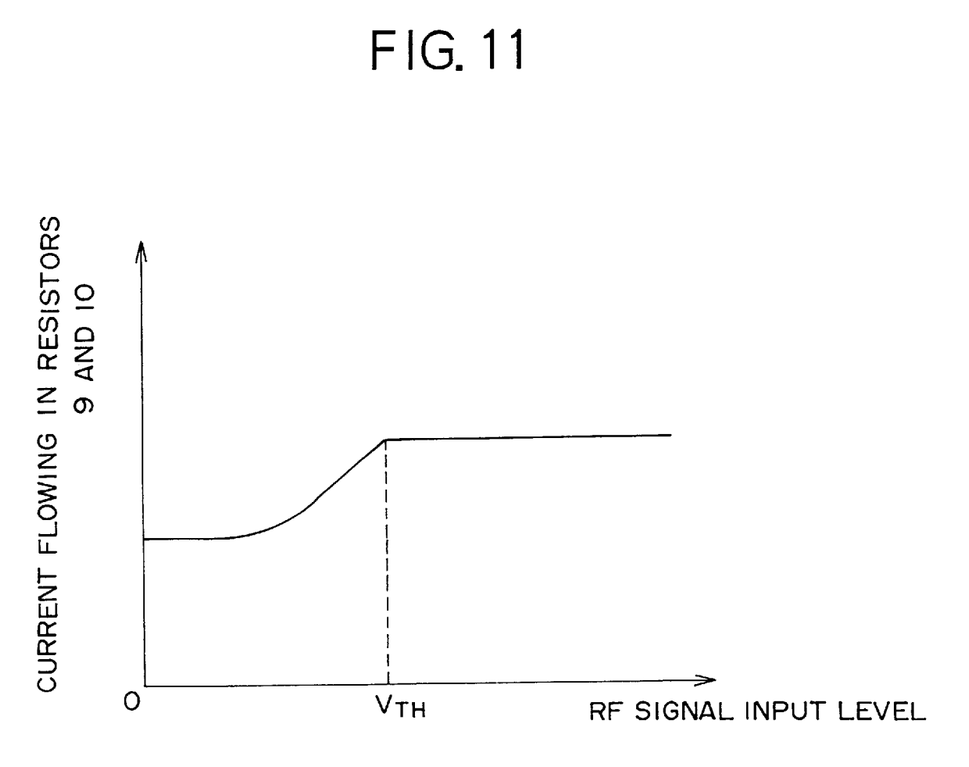
FIG. 11 is a graph showing the input/output characteristics of the reference voltage generating circuit shown in FIG. 8.

In this manner, the reference voltage generating circuit 7 is designed to have the input/output characteristics shown in FIG. 11, so that as a demodulated signal amplitude changes when the reception electric field is weak, the comparator reference levels of the LSB comparator 5 are changed to keep the positional relationship between the maximum demodulated signal amplitude and the comparator reference levels constant.

Figure 12:
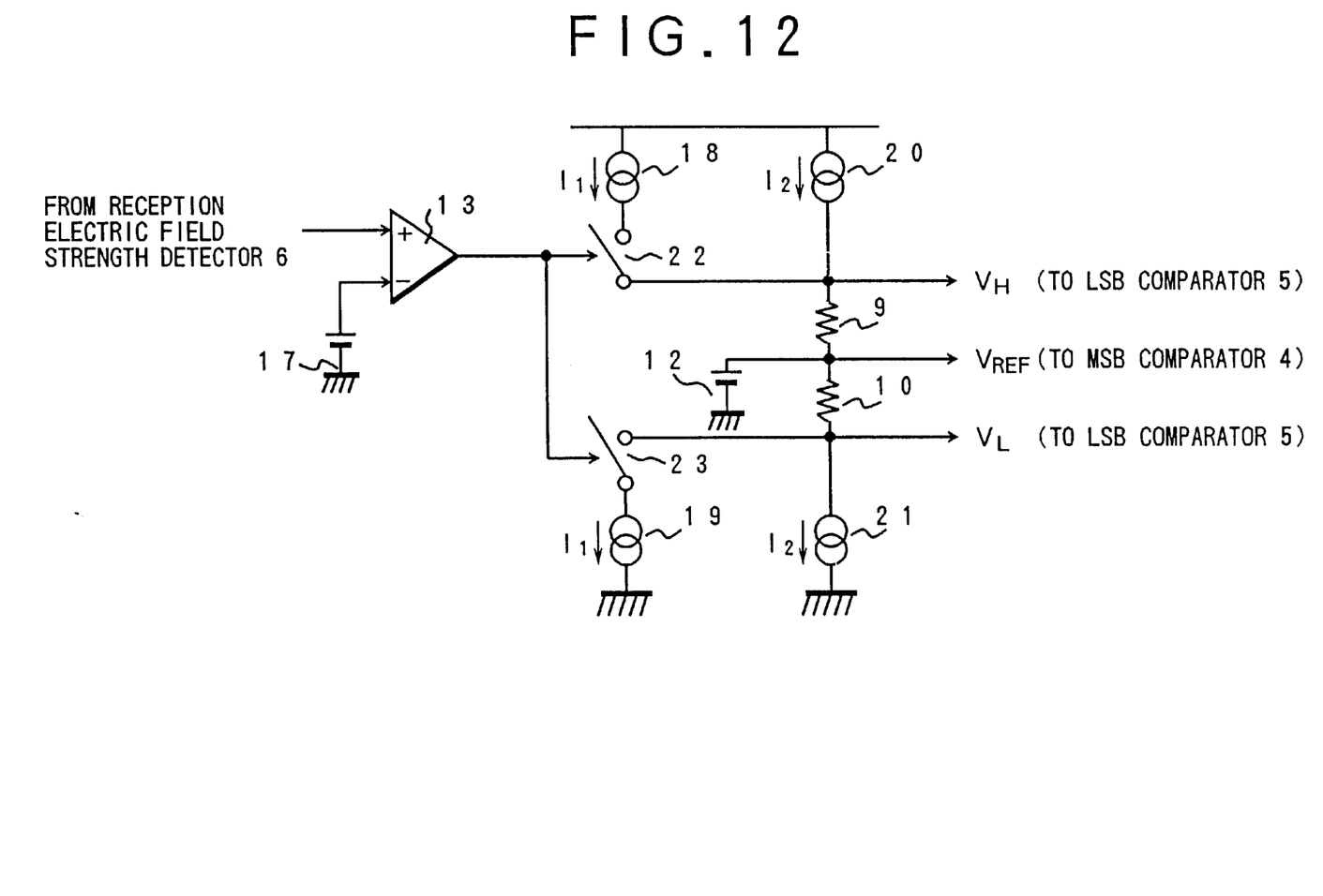
FIG. 12 is a circuit diagram showing a reference voltage generating circuit according to the second embodiment of the present invention.

The arrangement and operation of a reference voltage generating circuit 7 in FIG. 12 will be described next as the second embodiment of the present invention.

The reference voltage generating circuit 7 of the second embodiment includes a voltage comparator 13, a $V_{TH}$ bias 17, a $V_{REF}$ bias 12, constant current sources 18, 19, 20, and 21, resistors 9 and 10, and switches 22 and 23. The voltage comparator 13 has the property of outputting a HIGH signal when an output voltage from a reception electric field strength detector 6 is equal to or higher than a level $V_{TH}$, and outputting a LOW signal when the output voltage is lower than the level $V_{TH}$. Each of the switches 22 and 23 has the property of being turned on upon reception of a HIGH signal, and being turned off upon reception of a LOW signal.

With the above arrangement of the reference voltage generating circuit 7 as the second embodiment, when the output voltage from the reception electric field strength detector 6 is equal to or higher than the level $V_{TH}$, a HIGH signal is output from the voltage comparator 13, and the switches 22 and 23 are turned on. Consequently, a constant current $(I_1+I_2)$ flows in the resistors 9 and 10, and $V_H$ and $V_L$ become constant voltages. In contrast to this, when the electric field strength of the radio signal decreases, and an output voltage from the reception electric field strength detector 6 becomes lower than the level $V_{TH}$, a LOW signal is output from the voltage comparator 13, and the switches 22 and 23 are turned off. As a result, a constant current $I_2$ flows, and $V_H$ and $V_L$ become constant voltages.

Figure 13A:
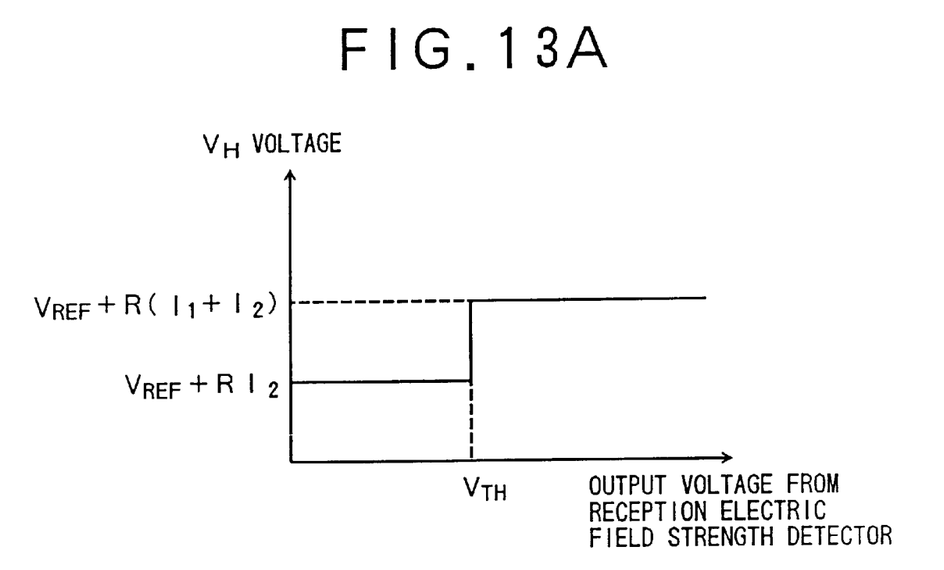
FIGS. 13A and 13B are graphs showing the input/output characteristics of the reference voltage generating circuit shown in FIG. 12.
Figure 13B:
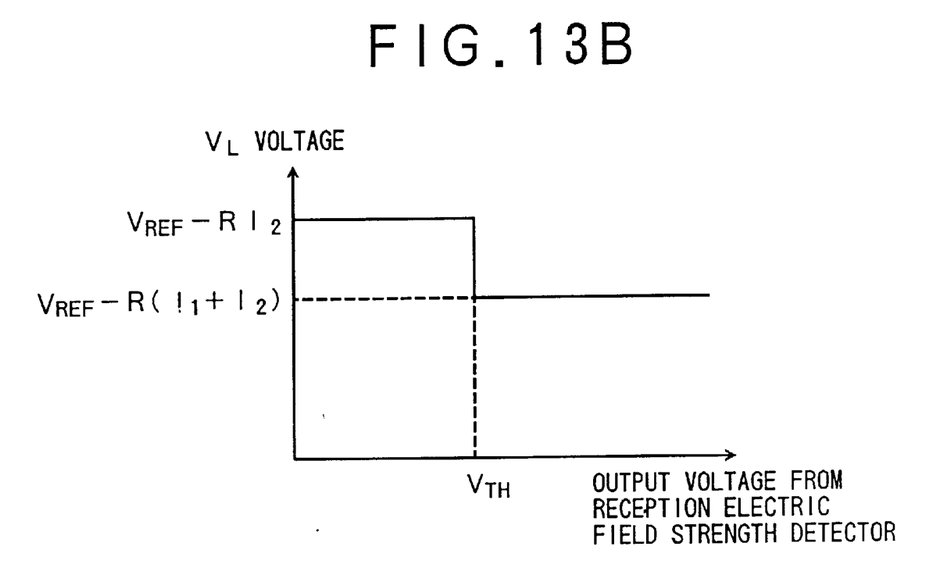

The reference voltage generating circuit 7 in the second embodiment is designed to have the characteristics shown in FIGS. 13A and 13B. With this circuit, as a demodulated signal amplitude changes when the reception electric field is weak, two different comparator reference levels $V_H$ and $V_L$ can be set with the level $V_{TH}$ being a reference voltage. This circuit is therefore inferior in characteristics to the circuit shown in FIG. 8, but allows simplification of the circuit.

Figure 14:
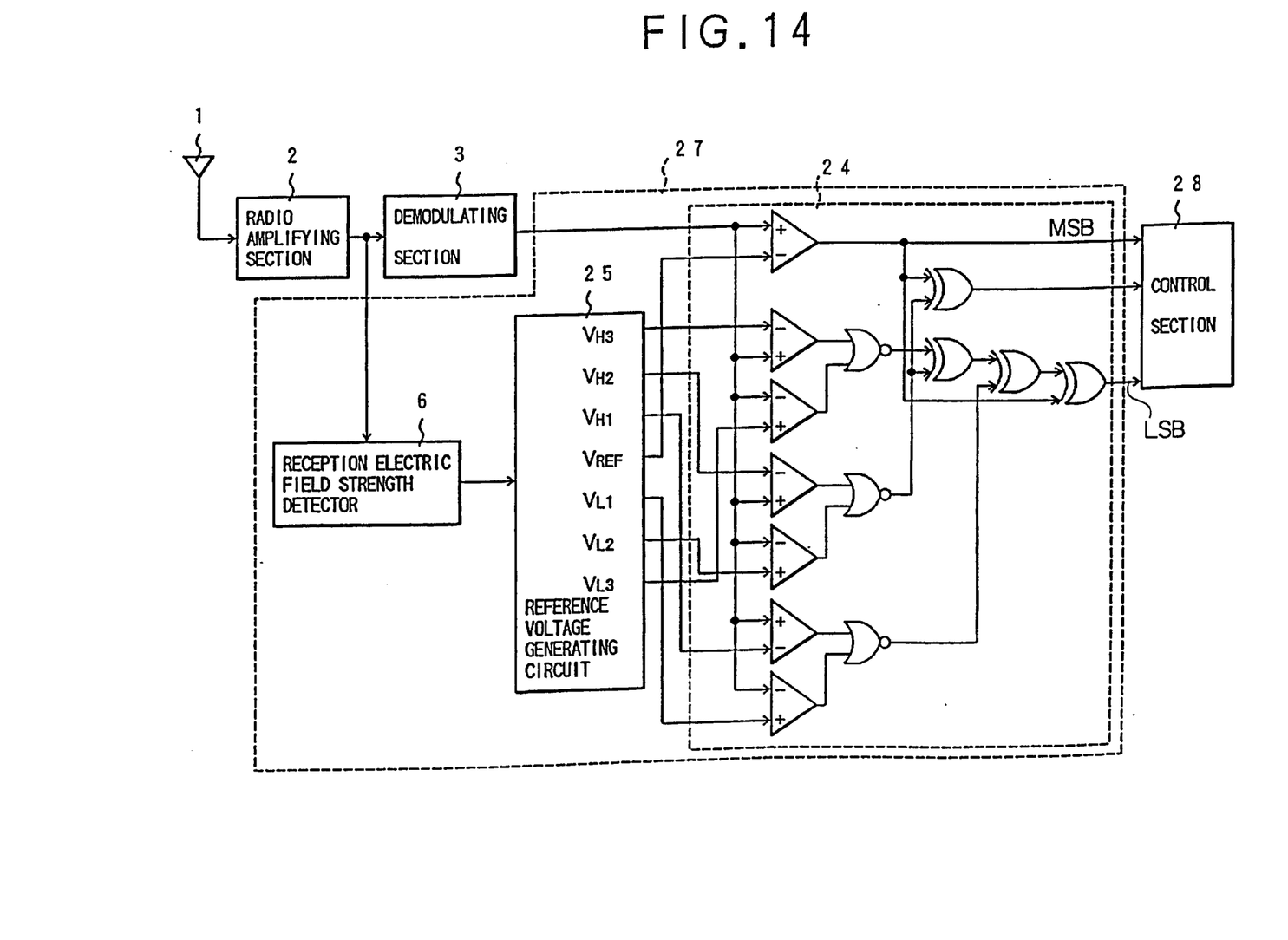
FIG. 14 is a block diagram showing an octonary FSK demodulation radio section according to the third embodiment of the present invention.

FIG. 14 is a block diagram showing an octonary FSK demodulation radio section as the third embodiment of the multivalued FSK demodulation window comparator of the present invention. An LSB comparator in the third embodiment has a plurality of input terminals, a plurality of reference voltage input terminals, and a plurality of determination output terminals and is designed to determine the absolute value of a frequency shift of a radio frequency so as to perform multivalued determination. Note that the operation of a reference voltage generating circuit 25 is the same as that of the circuits shown in FIGS. 8 and 12.

What is claimed is:

1. A multivalued FSK demodulation window comparator comprising a most significant bit (MSB) comparator for determining at least a polarity of a frequency shift of a radio frequency, a least significant bit (LSB) comparator for determining an absolute value of the frequency shift of the radio frequency, a reception electric field strength detector for detecting a strength of a radio signal and outputting a signal corresponding to the detected strength, and a reference voltage generating circuit for changing reference voltages of said LSB comparator in accordance with an output voltage from said reception electric field strength detector, wherein when the output voltage from said reception electric field strength detector is not higher than a predetermined level, a reference voltage from said reference voltage generating circuit changes.

2. A multivalued FSK demodulation window comparator according to claim 1, wherein said reference voltage generating circuit is designed to change reference voltages of said LSB comparator in accordance with a point at which the absolute value of the frequency shift of the radio signal decreases when the output voltage from said reception electric field strength detector is not higher than the predetermined level.

3. A multivalued FSK demodulation window comparator according to claim 1, wherein said reference voltage generating circuit is designed to change reference voltages of said LSB comparator by a DC voltage proportional to the output voltage from said reception electric field strength detector in a direction in which the absolute value of the frequency shift of the radio signal decreases when the output voltage from said reception electric field strength detector is not higher than the predetermined level.

4. A multivalued FSK demodulation window comparator according to claim 1, wherein said reference voltage generating circuit is designed to change reference voltages of said LSB comparator by a DC voltage proportional to an amount of variation in the output voltage from said reception electric field strength detector in a direction in which the absolute value of the frequency shift of the radio signal decreases when the output voltage from said reception electric field strength detector is not higher than the predetermined level.

5. A multivalued FSK demodulation window comparator according to claim 1, wherein said reference voltage generating circuit is designed to change reference voltages of said LSB comparator by a predetermined voltage, regardless of the output voltage from said reception electric field strength detector, in a direction in which the absolute value of the frequency shift of the radio signal decreases when the output voltage from said reception electric field strength detector is not higher than the predetermined level.

6. A multivalued FSK demodulation window comparator according to claim 1, wherein said LSB comparator comprises an LSB comparator having a plurality of input terminals, a plurality of reference voltage input terminals, and a plurality of determination output terminals and designed to determine an absolute value of a frequency shift of a radio frequency so as to perform multivalued determination.

7. A multivalued FSK demodulation window comparator according to claim 1, wherein said multivalued FSK demodulation window comparator is an octonary FSK demodulation window comparator.

8. A multivalued FSK demodulation window comparator comprising a most significant bit (MSB) comparator for determining at least a polarity of a frequency shift of a radio frequency, a least significant bit (LSB) comparator for determining an absolute value of the frequency shift of the radio frequency, a reception electric field strength detector for detecting a strength of a radio signal and outputting a signal corresponding to the detected strength, and a reference voltage generating circuit for changing reference voltages of said LSB comparator in accordance with an output voltage from said reception electric field strength detector.

9. A multivalued FSK demodulation window comparator according to claim 8, wherein said reference voltage generating circuit is designed to change reference voltages of said LSB comparator in accordance with a point at which the absolute value of the frequency shift of the radio signal decreases when the output voltage from said reception electric field strength detector is not higher than a predetermined level.

10. A multivalued FSK demodulation window comparator according to claim 8, wherein said reference voltage generating circuit is designed to change reference voltages of said LSB comparator by a DC voltage proportional to the output voltage from said reception electric field strength detector in a direction in which the absolute value of the frequency shift of the radio signal decreases when the output voltage from said reception electric field strength detector is not higher than a predetermined level.

11. A multivalued FSK demodulation window comparator according to claim 8, wherein said reference voltage generating circuit is designed to change reference voltages of said LSB comparator by a DC voltage proportional to an amount of variation in the output voltage from said reception field strength detector in a direction in which the absolute value of the frequency shift of the radio signal decreases when the output voltage from said reception electric field strength detector is not higher than a predetermined level.

* * * * *